United States Patent
Martin-Meyer et al.

(10) Patent No.: US 11,204,045 B2
(45) Date of Patent: Dec. 21, 2021

(54) ACTUATOR CONTROL ARRANGEMENT

(71) Applicant: GOODRICH ACTUATION SYSTEMS SAS, Saint Ouen l'Aumone (FR)

(72) Inventors: Johann Martin-Meyer, Maisons-Laffitte (FR); Gregory Meignat, Saint Germain-en-laye (FR); Christian Dumont, Maule (FR); Nicolas De Corta, Paris (FR)

(73) Assignee: GOODRICH ACTUATION SYSTEMS SAS, l'Aumone (FR)

( * ) Notice: Subject to any disclaimer, the term of this patent is extended or adjusted under 35 U.S.C. 154(b) by 0 days.

(21) Appl. No.: 16/709,480

(22) Filed: Dec. 10, 2019

(65) Prior Publication Data
US 2021/0018020 A1 Jan. 21, 2021

(30) Foreign Application Priority Data
Jul. 19, 2019 (EP) ..................................... 19315074

(51) Int. Cl.
*F15B 11/08* (2006.01)
*B64C 13/40* (2006.01)

(52) U.S. Cl.
CPC .............. *F15B 11/08* (2013.01); *B64C 13/40* (2013.01)

(58) Field of Classification Search
CPC .......... F15B 2211/325; F15B 2211/424; F15B 2211/895; F15B 20/001; F15B 20/008; F15B 11/08; F15B 20/002; B64C 13/40
See application file for complete search history.

(56) References Cited

U.S. PATENT DOCUMENTS

| | | | |
|---|---|---|---|
| 5,220,861 A * | 6/1993 | Kamimura | F15B 20/002 91/360 |
| 5,572,918 A | 11/1996 | Grundke et al. | |
| 8,434,301 B2 | 5/2013 | Fukui | |
| 8,651,428 B2 | 2/2014 | Parker | |
| 2004/0245386 A1 | 12/2004 | Huynh | |
| 2007/0221054 A1 | 9/2007 | Webster et al. | |

FOREIGN PATENT DOCUMENTS

| | | |
|---|---|---|
| DE | 102015109513 A1 | 12/2016 |
| EP | 3693615 A1 | 8/2020 |
| EP | 3693616 A1 | 8/2020 |

OTHER PUBLICATIONS

Extended European Search Report for International Application No. 19315074.5 dated Jan. 2, 2020, 8 pages.

* cited by examiner

*Primary Examiner* — Abiy Teka
(74) *Attorney, Agent, or Firm* — Cantor Colburn LLP

(57) ABSTRACT

An actuator control arrangement comprising: a hydraulic actuator having a housing and a piston rod axially moveable within the housing between a neutral position, a retracted position and an extended position with respect to the housing in response to application of pressure to the piston rod; the arrangement further comprising a check valve moveable between a first position providing a flow path between a pressure source and the actuator, and a second position in which the flow path is closed off; and characterised by a mechanical link between the piston rod and the check valve, actuated in response to the piston rod passing a predetermined retracted position in a negative stroke direction, to set the check valve to the first position.

7 Claims, 5 Drawing Sheets

ACTUATOR CONTROL ARRANGEMENT

CROSS-REFERENCE TO RELATED APPLICATIONS

This application claims the benefit of European Application 19315074.5 filed Jul. 19, 2019, the disclosure of which is incorporated herein by reference in its entirety.

TECHNICAL FIELD

The present disclosure relates to valve arrangements for controlling a hydraulic actuator for positioning a spoiler in an aircraft.

BACKGROUND

Hydraulic actuators find many applications, particularly in controlling movement of a moveable component. In aircraft, many moveable components and surfaces are moved by means of a hydraulic actuator.

In general terms, a hydraulic actuator comprises a cylindrical housing in which is mounted an axially moveable piston rod. A head of the rod, inside the housing, divides the housing into two chambers each having a fluid port via which pressurised fluid can be injected into the chamber or low pressure fluid exits the chamber, so as to change the relative pressure in the two chambers either side of the piston head, thus causing movement of the piston relative to the housing. A free end of the piston rod that extends out of the housing is attached to a component or surface to be moved. Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction or and pressure of the fluid applied to the actuator, which is in response to a control signal.

As the piston rod moves relative to the housing, the moveable component or surface to which it is attached will move accordingly.

To allow both extension of the rod and retraction of the rod, a valve is provided to set the movement to extension or retraction. This may be a servovalve, more specifically an electrohydraulic servovalve (EHSV). The valve is positioned between the hydraulic fluid supply and the actuator and is moveable, in response to an electric control signal, between a first position in which high pressure fluid flows from the supply into one chamber of the actuator housing and low pressure fluid exits from the other chamber, and a second position in which high pressure fluid is injected into the other chamber and withdrawn from the first chamber of the actuator housing. The valve may also have a neutral or closed position in which fluid is neither supplied to nor withdrawn from the actuator housing.

One particular application for hydraulic actuators controlled by an EHSV is in controlling movement of a spoiler on the wing of an aircraft. A spoiler is a moveable surface mounted on an aircraft wing behind the wing flap. When the aircraft is cruising, both the wing flap and the spoiler lay flat along the wing. To reduce aircraft speed, the spoiler is raised upwards relative to the wing.

The spoiler movement is caused by a hydraulic actuator extending as described above.

If electric power is lost when the spoiler is extended, excessive drag could be exerted by the spoiler. Systems are known, therefore, to retract the spoiler to its 'zero' position in the housing in the event of electric power loss. Usually, this is by means of the EHSV being biased to a valve position where the high pressure fluid is provided to the chamber on the piston rod side of the piston head so that the pressure on that side of the head is greater than in the other chamber, causing the piston to retract into the housing. This will be described further below.

Conventionally, a mechanical stop inside the housing stops the piston rod at the zero position.

Problems can also occur in spoiler control if there is a loss of hydraulic power. Here a solution to prevent extension of the actuator, is an anti-extension valve between the EHSV and the actuator that is switched to a pressure relief position when the hydraulic pressure falls below a predetermined pressure (usually 1.2 times a given 'stall' pressure). Again this will be described further below.

If the spoiler is extended, and pressure is lost, the spoiler will be retracted by aerodynamic load, and will gradually drop to become aligned with the wing surface until the zero hinge position is reached. It is important to keep the spoiler at this position to prevent a spurious extension.

Most aircraft have a spoiler that operates using a positive stroke of the actuator rod—i.e. for extension of the rod to lift the spoiler. The stroke of the actuator is between a 'zero' position in the housing and an extended position and the control system is biased to return the rod to the zero position.

More recently, some aircraft have incorporated a 'droop' function in the spoiler, using a negative stroke of the piston rod—i.e. further back into the housing than the zero position or, put another way, a stroke moving from the zero position in the opposite direction to the direction moved in the positive stroke for extending the rod.

The droop function is used to lower the spoiler relative to the wing e.g. for high lift manoeuvers or to close a large air gap between the wing flap and the spoiler if the wing flap is extended. Droop is described in EP19305167 and EP19305168.7.

A problem occurs in the area of overlap of the spoiler and the wing flap ranges of motion. If, for example, electrical power driving the spoiler is lost, the spoiler will, under its own weight or under pressure from the EHSV bias, press against the wing flap when not driven by the actuator, thus interfering with movement of the wing flap if retraction is demanded. In the event of hydraulic failure, the anti-extension valve will be activated and the flap will then overcome the anti-extension threshold to be able to push on the spoiler and thus return to its neutral position.

The inventors have, however, identified a need to provide a valve and piston assembly that allows spoiler droop—i.e. a negative stroke—whilst preventing the spoiler and flap from interfering with each other in the case of electrical failure and hydraulic failure.

SUMMARY

The disclosure provides an actuator control arrangement comprising: a hydraulic actuator having a housing and a piston rod axially moveable within the housing between a neutral position, a retracted position and an extended position with respect to the housing in response to application of pressure to the piston rod; the arrangement further comprising a check valve moveable between a first position providing a flow path between a pressure source and the actuator, and a second position in which the flow path is closed off;

and characterised by a mechanical link between the piston rod and the check valve, actuated in response to the piston rod passing a predetermined retracted position in a negative stroke direction, to set the check valve to the first position.

The check valve is preferably biased to the second position by means of a spring and comprises a first port arranged to receive a pressure input from a pressure source and a second port arranged to receive a mechanical input from the mechanical link, whereby the pressure input or the mechanical input is sufficient to overcome the force of the spring to move the check valve to the first position. The first port may comprise two pressure ports—one for receiving high pressure from a high pressure source and another for receiving pressure from the actuator when it retracts.

The mechanical link may comprise a protrusion or chamfer or the like extending into the housing in the path of travel of the piston head in negative stroke, whereby at the predetermined retracted position, the piston head pushes the mechanical link to apply the mechanical input to the check valve.

The arrangement preferably also includes an electrohydraulic servovalve (EHSV) between the pressure source and the actuator to control the direction of pressurised fluid to the actuator in response to an electric control signal. The EHSV is preferably moveable between a first position in which high pressure fluid is directed from the fluid source to a first chamber of the actuator to cause extension of the piston rod and a second position whereby high pressure fluid is directed to a second chamber of the actuator to cause retraction of the piston rod with respect to the housing.

The default position of the EHSV is preferably the neutral position, first position.

Preferably a solenoid valve is controlled to take up a first position or a second position in response to the electric control signal, whereby when the solenoid valve is in the first position, high pressure is provided to the first port of the check valve to force the check valve to the first position, and in the second position provides a flow path for fluid from the check valve to a low pressure reservoir.

Any of the above features may be used together, in any combination

BRIEF DESCRIPTION OF THE DRAWINGS

Preferred embodiments will now be described by way of example only and with reference to the drawings.

DETAILED DESCRIPTION

Figure 1:
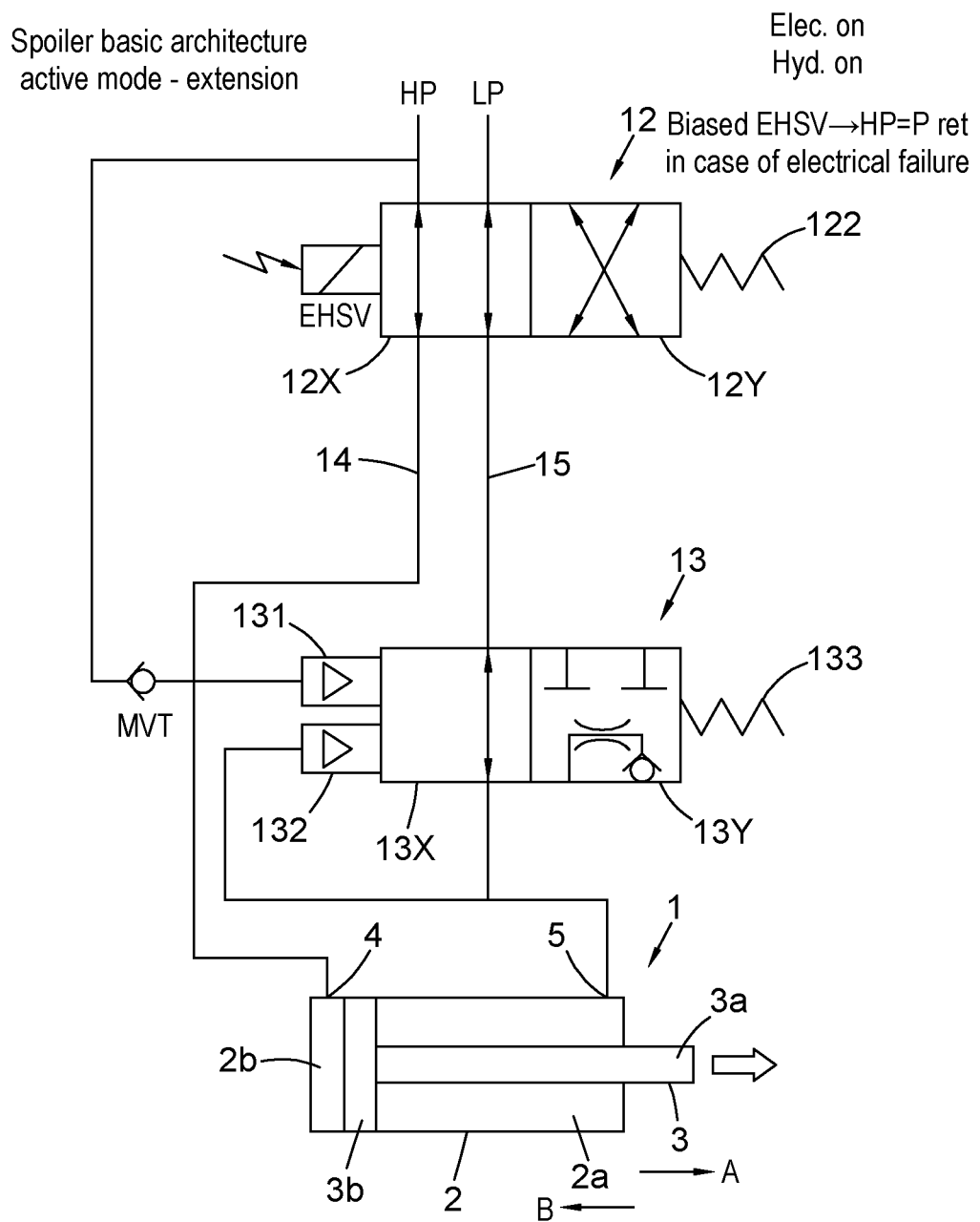
FIG. 1 is a schematic view of a conventional actuator control valve arrangement.

Referring to FIG. 1, a known positive stroke operation of an actuator control valve arrangement will first be described.

FIG. 1 shows a hydraulic actuator 1 comprising a housing 2 and a piston comprising a piston rod 3 axially moveable in the housing 2. Movement of the piston rod 3 relative to the housing 2 is caused by providing pressurised hydraulic fluid from a fluid supply 10 to the actuator 1 via ports 4,5 in the actuator housing 2 in response to an electric control signal. The piston rod has a free end 3a extending out of the housing and for attachment to the surface to be moved by the actuator (not shown). The other end of the piston rod inside the housing 2 has a piston head 3b that extends across the diameter of the housing 2 thus dividing the housing interior into two chambers 2a,2b—one on each side of the piston head 3b.

If the piston rod 3 is to be extended out of the housing 2, high pressure fluid from a source HP is provided via a fluid line 14 into chamber 2b of the housing 2 via port 4 which causes the piston rod to move in the direction of arrow A. Fluid present in chamber 2a is thus forced from the housing 2, as the piston head moves through the housing, on the other side of the piston head, via port 5, on fluid line 15, to a reservoir (not shown) as low pressure (LP) fluid. If the piston rod 3 is to be retracted from the extended position, high pressure fluid is provided to chamber 2a via port 5 causing the piston rod 3 to move in the direction of arrow B and fluid is ejected from chamber 2b via port 4 to the reservoir.

The direction of fluid is controlled by a EHSV valve 12 which takes up different valve positions in response to the electric control signal (not shown). For extending the rod as described above, the EHSV valve is positioned at position 12X i.e. with the lines shown in 12X aligned with the fluid lines from the supply and to the reservoir.

For retraction of the piston rod 3, the fluid lines are reversed by the EHSV valve being at position 12Y. The EHSV may also have a neutral position where there is no fluid flow in either direction. The EHSV valve is preferably biased to position 12Y via EHSV spring 122. Thus, in the event of loss of electric power, the EHSV will revert to position 12Y to avoid extension.

A mechanical stop (not shown) in chamber 2b, stops the retracted rod at the 'zero' position.

To avoid extension of the actuator in the event of loss of hydraulic pressure, an anti-extension valve 13 is provided. The anti-extension valve 13 is usually in position 13X allowing fluid communication between the actuator and the EHSV 12, because the fluid pressure provided at ports 131 and 132 together exceed the force of the relief valve spring 133. In the event that of hydraulic failure, there is no pressure at port 131. The pressure created by a tensile load at port 132 is not enough to overcome the bias of the spring 133 and so the spring pushes the anti-extension valve 13 to position 13Y which holds the piston rod at the zero position.

In practice, end 3a of the piston rod 3 is attached to the component or surface to be moved e.g. the spoiler (not shown).

The system is also operable in a droop mode as briefly discussed above where, in response to an electric control signal, through a solenoid valve, the actuator piston rod undergoes a negative stroke—i.e. the piston head moves away from the zero position in the opposite direction to when extending (direction B).

As discussed above, if pressure stops being supplied to the actuator, in the droop (negative stroke) mode, the spoiler (or other component) will apply a downwards force due to its own weight. This can interfere with the movement of other components such as a wing flap since the anti-extension will be activated.

The present disclosure therefore provides a control system for a spoiler which allows reliable operation in droop mode (negative stroke) and provides the necessary safety features in the event of loss of hydraulic and/or electric power, when the spoiler is in negative stroke or droop mode. The arrangement ensures that even for negative stroke of the spoiler, and in the case of electrical/hydraulic failure, the spoiler will be re-centered passively. This will permit the flap to retract without having to overcome any load in the opposite direction from the spoiler.

As with conventional systems, the actuator 100 comprises a housing 200 within which a piston rod 300 is moveable according to the balance of pressure either side of the piston rod head 300b. The free end 300a of the piston rod 300 will be attached to a moveable surface e.g. the spoiler (not shown).

The direction of movement of the piston rod 300 relative to the housing 200 (and thus whether the rod and, also, the spoiler, is extended or retracted) is determined by the direction of flow of high pressure hydraulic fluid from a supply HP.

The actuator housing 200 has two ports 400 and 500, one either side of the neutral or zero position of the piston head in the housing. If the spoiler is to be extended and, therefore, the rod is to be extended from the housing 200, the arrangement, responsive to an electric control signal, will control high pressure fluid HP to be injected into the chamber 200b (shown to the left of FIG. 2) which will force the piston rod 300 in the direction of arrow A. Low pressure fluid will be ejected from port 500 at chamber 200a to the LP reservoir.

If the piston rod 300 is to retract, then in response to the electric control signal, the high pressure fluid will be injected into chamber 200a via port 500 and this will force the piston head back into the chamber. Low pressure fluid will be ejected via port 400 back to the reservoir.

The direction of fluid flow is controlled by EHSV 120 which changes position in response to the control signal. For extension of the piston rod. EHSV takes position 120X creating a fluid line from HP to port 400 and from port 500 to LP. For retraction, EHSV takes up position 120Y so that a fluid path is created from HP to port 500 and from port 400 to LP.

Anti-extension valve or check valve 130 operates as described above with reference to FIG. 1 whereby the usual position is 130X to complete the fluid path to port 500, but in the event of the pressure at ports 130a and 130b being less than the set force of the spring 600 (usually 1.2 times Fstall—the predetermined stall force), the spring force drives the anti-extension valve to position 130Y to prevent extension of the piston rod.

Figure 2:
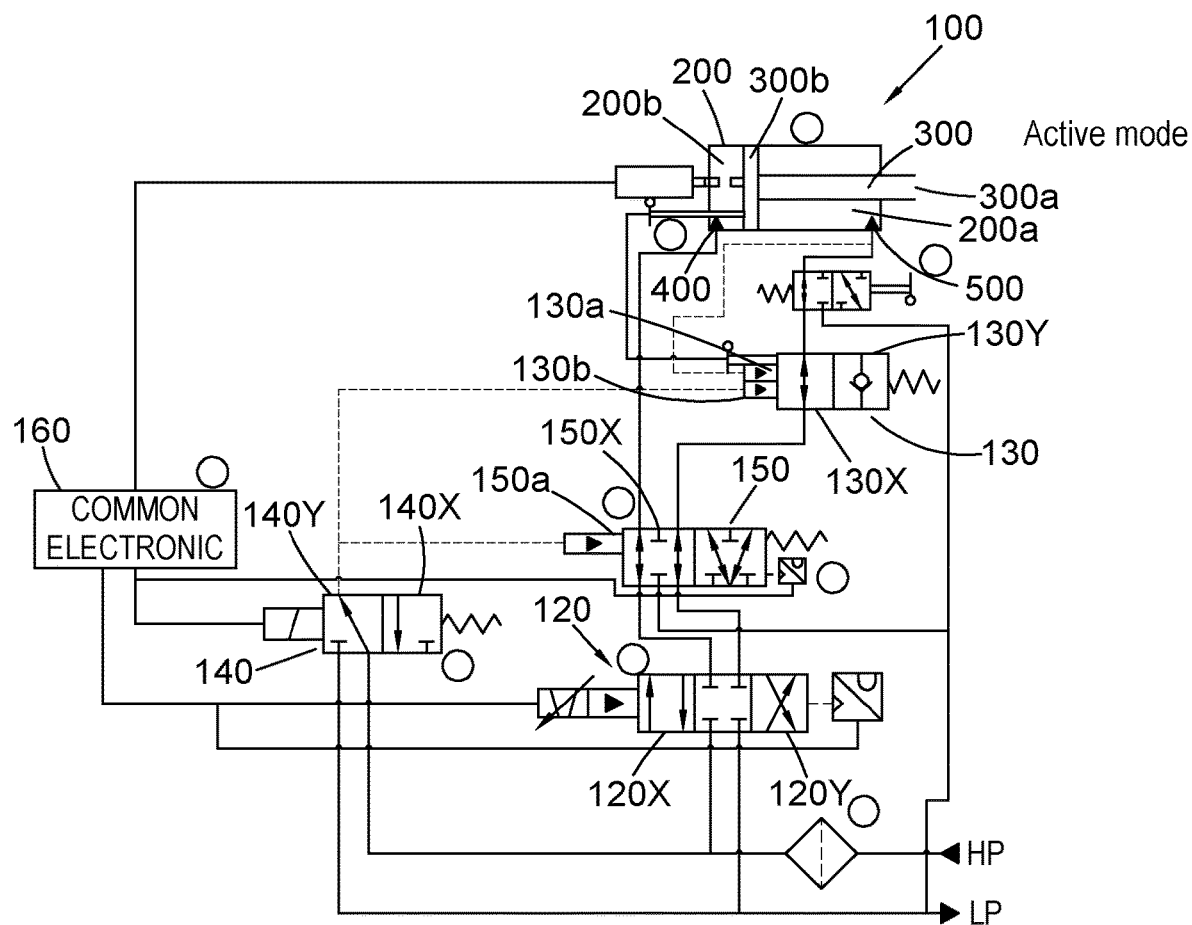
FIG. 2 is a schematic view of an actuator control valve arrangement according to the present disclosure in a first state or active mode.

In active mode, as shown in FIG. 2, the piston is in positive stroke. In this mode, solenoid valve 140 is set to position 140Y so that high pressure from source HP flows through that valve via valve line 42 forcing check valve 130, via high pressure at port 130b, to move to the right (in the drawing) to open the check valve providing a fluid path between the mode valve 150 and chamber 200b. The position of the solenoid valve 140 also provides a high pressure fluid path to the port 150a of the mode valve 150 setting it to position 150X to provide a fluid path to the servovalve 120.

In this configuration, when the piston is to be extended, in active (positive stroke) mode, servovalve 120 is caused to move to position 120X by the controller 160. High pressure fluid from source HP then flows through servovalve 120, through mode valve 150 and into chamber 200a of the actuator, pushing the piston out of the housing to the extended position. This forces fluid out of chamber 200b via port 500, through check valve 130 (via a maintenance device 45, if desired), back through mode valve 150 and servovalve to the low pressure output LP.

As mentioned above, the primary task of the mode valve 150 is to activate or passivate the actuator. This mode valve is the main device to choose between the active mode and the anti-extension mode (or droop mode when the rod is in retraction). In the example shown, the mode valve includes a damping device which becomes useful when the actuator is in droop mode. With the help of the damping function, if the actuator is moving in droop mode, it has a small resistance that avoids the phenomena called free float. This increases the stability of the wing.

A maintenance device 45, if included, allows the possibility to depressurize the retraction chamber when the aircraft is on the ground. Without this device it would be impossible to manually extend the actuator because of the pressure entrapped in it. With the maintenance device, the aircraft maintenance crew can activate this device and extend the spoiler to be able access beneath the wing surface.

If, in the positive stroke, active mode, the piston is to be controlled back from the extended position to the retracted or 'zero' position, servovalve (120) is moved to position (120Y) to exchange the high and low pressure fluid flow paths so that high pressure fluid is provided to chamber (200a) via port (500) and exits the actuator via port (400).

Figure 3:
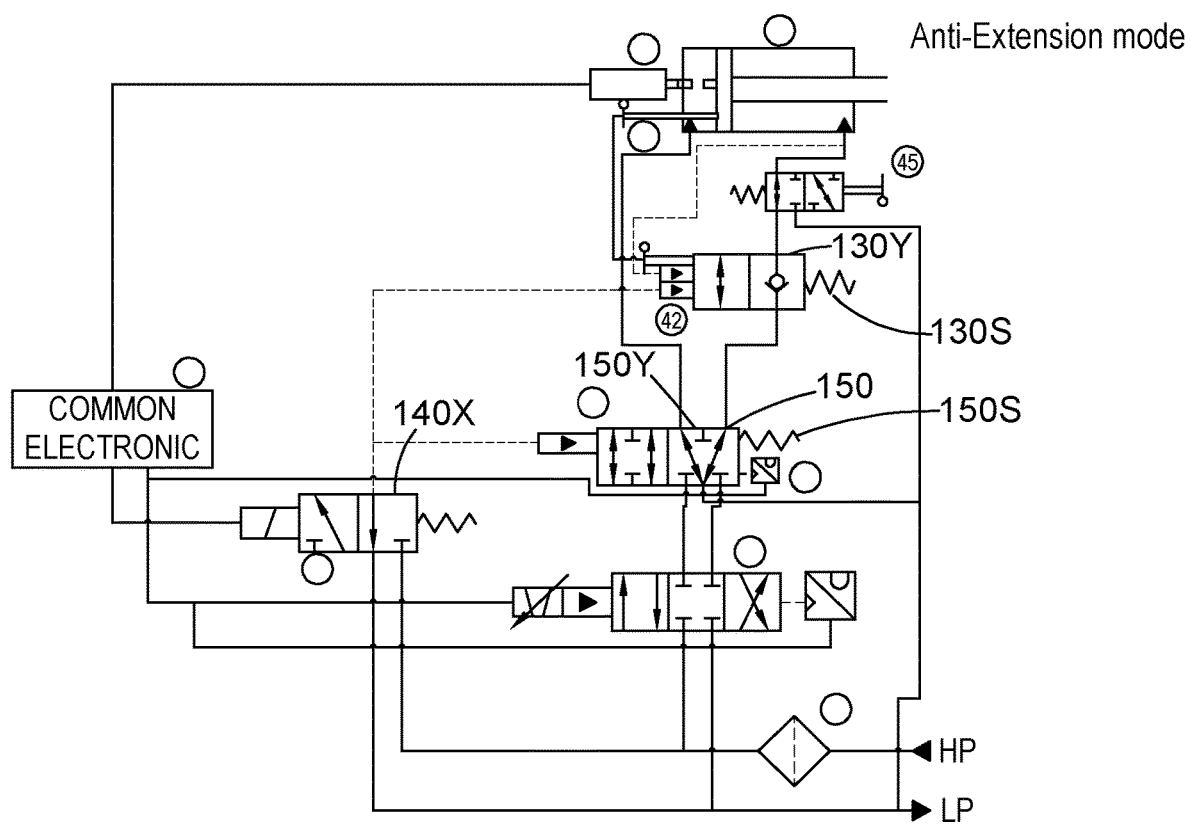
FIG. 3 is a schematic view of an actuator control valve arrangement according to the present disclosure in a second state or anti-extension mode.

In anti-extension mode, the system takes the configuration of FIG. 3. Here the spoiler is commanded to retain its neutral position.

In response to the neutral position command, solenoid valve 140 is in position 140X. There is thus no flow of high pressure from source HP to the check valve via valve line 42 and so the force of the check valve spring 130S returns the check valve to the closed position. Low pressure fluid is provided to chamber 200b at port 400 via the mode valve 150 which is returned by the force of its spring 150S to position 150Y and this is balanced by the forces acting on the open side of the piston since fluid cannot flow out of chamber 200a via the closed check valve.

Figure 4:
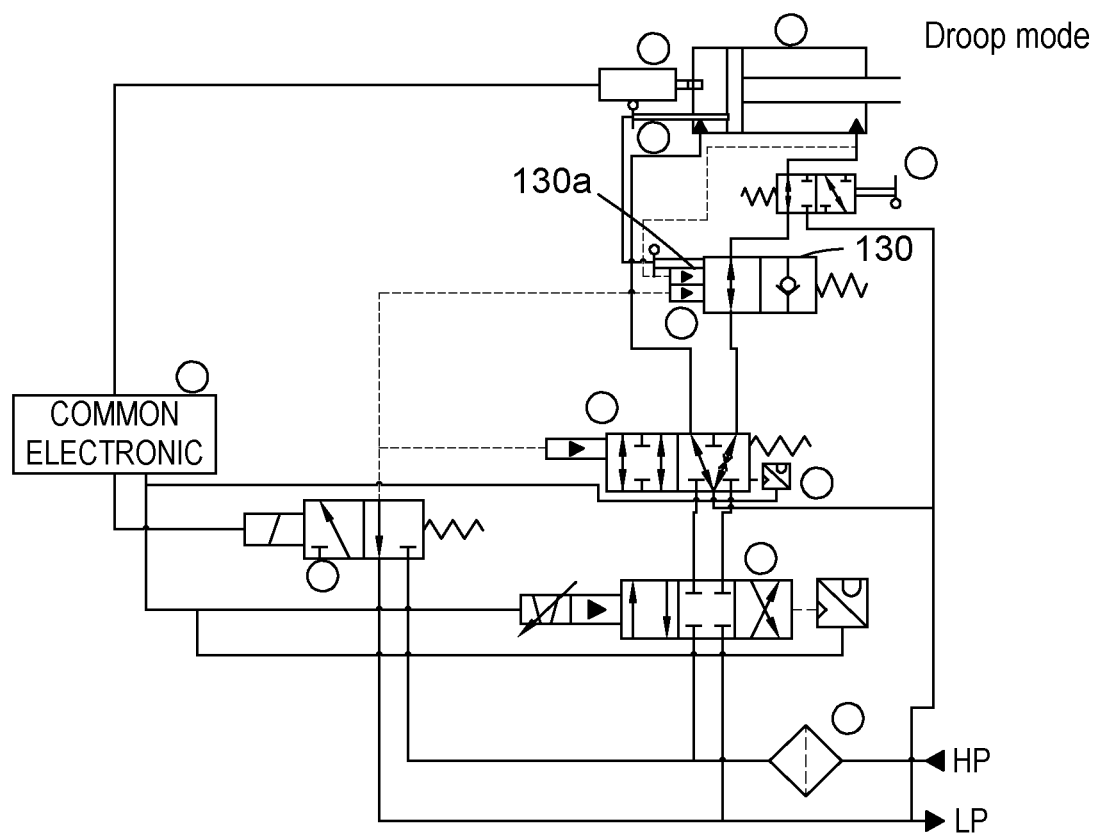
FIG. 4 is a schematic view of an actuator control valve arrangement according to the present disclosure in a third state or droop mode.

If the piston is in negative stroke to provide a droop mode (FIG. 4), a mechanical trigger (described further below) will cause the check valve to move to the right (with respect to the drawing) to take up the open position due to a mechanical link acting on port 130a of that valve. This allows the system to set to the so-called by-pass mode in the event of hydraulic or mechanical failure at a given negative stroke position.

Figure 5:
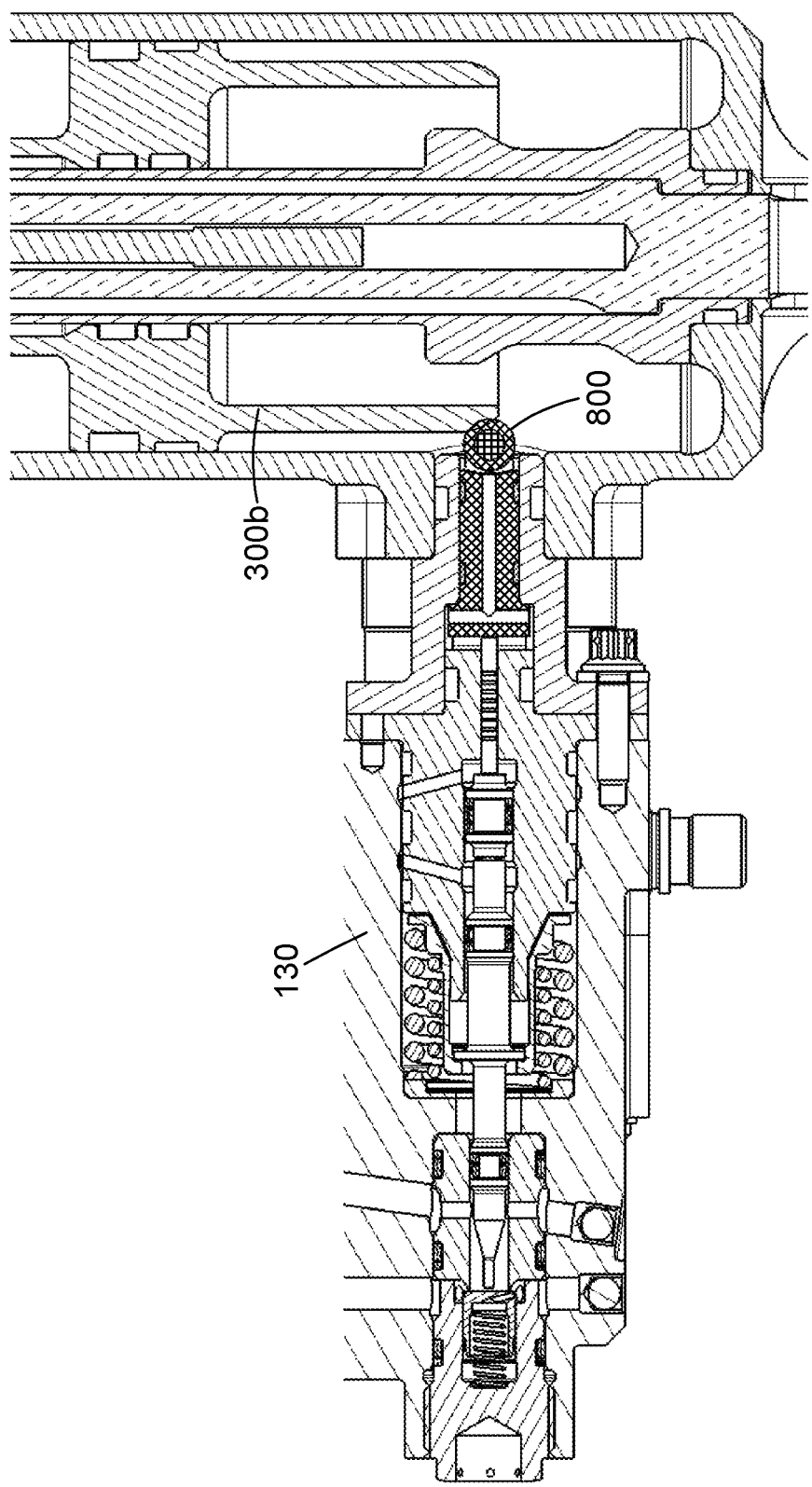
FIG. 5 is a schematic cross-sectional view of an actuator control valve arrangement according to the present disclosure.

This mechanical link between the piston position and the valve line 42 can be better seen with reference to FIG. 5.

As seen in FIG. 5, a mechanical chamfer 800 extends into the actuator housing at a position behind the neutral position—i.e. at a position reached by the piston head when in negative stroke relative to neutral. When the piston reaches this negative stroke position, it abuts against the chamfer 800 which, in turn, pushes the check valve against its spring bias to take up the open position 130X. The open position of the check valve is therefore not dependent on electric signals from the controller or on a hydraulic path as in the other modes described below.

Signals can be provided to solenoid valve 140 via the control electronic 160s, as described above and also to the EHSV 120, to set the positions of those valves to control hydraulic flow for moving the piston but, in the case of electric or hydraulic failure, the check valve will remain open.

If the actuator is in negative stroke, and there is a pressure failure, the rod could, without the present invention, extend and push down on or interfere with movement of the wing flap.

With the system of the invention, in normal circumstances, where there is no electrical or hydraulic failure, the position of the spoiler will be controlled by the valves and flow paths in the known manner.

In the event of an electrical failure (but no hydraulic failure), in positive stroke operation, if the aerodynamic force pulls in the extending direction, there will be no movement because of the anti-extension function described above. If the aerodynamic force pushes to return the piston, the piston will return to the neutral position. In the case of negative stroke when the electrical failure occurs, the force of the flap and aerodynamic force will return the piston to neutral. The same applies in the event of hydraulic failure but no electrical failure and also in the event of both electrical and hydraulic failure.

With the arrangement of the present disclosure, in the event of hydraulic failure, it will be possible to move the spoiler flap manually for maintenance etc. as there will be no strong hydraulic forces acting on it.

The present arrangement provides a simple, lightweight design to permit reliable droop function using existing components whilst also allowing a simple (even manual) movement of the spoiler in the event of hydraulic failure.

Although the figures and the accompanying description describe particular embodiments and examples, it is to be understood that the scope of this disclosure is not to be limited to such specific embodiments, and is, instead, to be determined by the following claims.

What is claimed is:

1. An actuator control arrangement comprising:
    a hydraulic actuator having a housing and a piston rod axially moveable within the housing between a neutral position, a retracted position and an extended position with respect to the housing in response to application of pressure to the piston rod;
    a check valve moveable between a first position providing a flow path between a pressure source and the actuator, and a second position in which the flow path is closed off; and
    a mechanical link between the piston rod and the check valve, actuated in response to the piston rod passing a predetermined retracted position in a negative stroke direction, to set the check valve to the first position;
    wherein the check valve is biased to the second position by means of a spring and comprises a first port arranged to receive a pressure input from a pressure source and a second port arranged to receive a mechanical input from the mechanical link, whereby the pressure input or the mechanical input is sufficient to overcome the force of the spring to move the check valve to the first position;
    wherein when the check valve is in the second position and the piston is moving towards the extended position in a positive stroke direction, the piston is returned to the neutral position from the extended position.

2. The actuator control arrangement of claim 1, wherein the mechanical link comprises a protrusion or chamfer extending into the housing in the path of travel of the piston rod in negative stroke, whereby at the predetermined retracted position, the piston rod pushes the mechanical link to apply the mechanical input to the check valve.

3. The actuator control arrangement of claim 1, further comprising an electrohydraulic servovalve, EHSV, between a pressure source and the actuator to control a direction of pressurised fluid to the actuator in response to an electric control signal.

4. The actuator control arrangement of claim 3, wherein the EHSV is moveable between a first position in which high pressure fluid is directed from a fluid source to a first chamber of the actuator to cause extension of the piston rod and a second position whereby high pressure fluid is directed to a second chamber of the actuator to cause retraction of the piston rod with respect to the housing.

5. The actuator control arrangement of claim 3, wherein the default position of the EHSV is the second position.

6. The actuator control arrangement of claim 1, further comprising a solenoid valve controlled to take up a first position or a second position in response to an electric control signal, whereby when the solenoid valve is in the first position, high pressure is provided to a first port of the check valve to force the check valve to the first position, and in the second position provides a flow path for fluid from the check valve to a low pressure reservoir.

7. A spoiler control arrangement for an aircraft, comprising:
    a spoiler moveable relative to a wing surface; and
    an actuator control arrangement as claimed in claim 1, the actuator arranged to move the spoiler by movement of the piston rod.

* * * * *